(12) United States Patent
Pfister et al.

(10) Patent No.: US 8,353,805 B2
(45) Date of Patent: Jan. 15, 2013

(54) HYDRAULIC SUPPLY SYSTEM FOR A HYDRAULICALLY ACTUATED AUTOMATIC TRANSMISSION

(75) Inventors: Jochen Pfister, Strasbourg (FR); Reinhard Stehr, Bühl (DE); Eric Müller, Kaiserslautern (DE); Roshan Willeke, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 934 days.

(21) Appl. No.: 12/316,251

(22) Filed: Dec. 10, 2008

(65) Prior Publication Data

US 2009/0170657 A1 Jul. 2, 2009

Related U.S. Application Data

(60) Provisional application No. 61/007,007, filed on Dec. 10, 2007.

(51) Int. Cl.
*F16H 61/662* (2006.01)
(52) U.S. Cl. .......................................................... 477/45
(58) Field of Classification Search .................... 477/45, 477/46; 474/8–29
See application file for complete search history.

(56) References Cited

U.S. PATENT DOCUMENTS

| 7,389,640 | B2 | 6/2008 | Müller et al. .................... 60/430 |
| 7,543,695 | B2* | 6/2009 | Redelman et al. ............ 192/221 |
| 2005/0064975 | A1 | 3/2005 | Takagi et al. .................. 475/101 |
| 2006/0105867 | A1* | 5/2006 | Reuschel ......................... 474/18 |
| 2008/0064564 | A1* | 3/2008 | Faust ............................... 477/45 |
| 2008/0220917 | A1* | 9/2008 | Grethel et al. ................... 474/28 |

FOREIGN PATENT DOCUMENTS

| EP | 1 116 620 A2 | 7/2001 |
| WO | WO 03/087627 A1 | 10/2003 |

* cited by examiner

*Primary Examiner* — Michael Mansen
*Assistant Examiner* — Robert T Reese
(74) *Attorney, Agent, or Firm* — Alfred J. Mangels

(57) ABSTRACT

A hydraulic supply system for a hydraulically actuated automatic transmission, in particular for a belt-driven conical-pulley transmission. The system includes a primary pump driven by a primary drive system to provide pressure in a supply line connected to a regulating valve. The supply line is connected through a pilot valve to a control line in which a control valve is situated, with which the pressure that determines the setting of a transmission ratio adjusting valve is set. An auxiliary pump driven by an auxiliary drive system that is separate from the primary drive system includes an outlet line connected to the control line through a first valve that opens in the direction of the control line, and is connected to the supply line through a second valve that opens in the direction of the supply line.

7 Claims, 3 Drawing Sheets

HYDRAULIC SUPPLY SYSTEM FOR A HYDRAULICALLY ACTUATED AUTOMATIC TRANSMISSION

BACKGROUND OF THE INVENTION

1. Field of the Invention

The present invention relates to a hydraulic supply system for a hydraulically actuated automatic transmission.

2. Description of the Related Art

A known belt-driven conical-pulley transmission subassembly is shown in FIG. 3 in a longitudinal cross-sectional view. The conical pulley subassembly includes a shaft 10, to which an axially fixed disk 12 is rigidly connected. Situated on shaft 10 and axially movable along a splined connection but non-rotatably carried by the shaft 10 is an axially movable disk 16. Conical surfaces of disks 12 and 16 face each other, between which a continuous torque-transmitting means (not shown) circulates, which connects the illustrated conical disk pair with another conical disk pair (not shown) of the belt-driven conical-pulley transmission.

In a radially outer area of axially movable disk 16, on its side facing away from the conical surface, an annular cylinder 18 having two radially spaced, axially-extending walls defining a U-shaped cross section is rigidly attached. On the radially inner side of annular cylinder 18 a guide ring component 20 formed with a guide surface is rigidly attached.

Rigidly connected to shaft 10 at a distance from axially movable disk 16 is a support ring component 22, which includes a first axially-extending annular projection 24 that is designed on its free face with circumferentially distributed first ramp surfaces 26. Radially outwardly of the first annular projection 24, support ring component 22 includes a second axially-extending annular projection 28 that extends between the walls of annular cylinder 18. Second annular projection 28 is movable within annular cylinder 18 and includes seals, so that an adjusting chamber 30 is formed between second projection 28 and annular cylinder 18, which chamber is chargeable with hydraulic fluid through radial bores 32 in axially movable disk 16 and shaft 10, as well as a supply bore 34 extending within shaft 10.

Between support ring component 22 and axially movable disk 16, an annular sensing piston 36 is guided on shaft 10 so that it can move axially. Sensing piston 36 is generally cup-shaped, having an opening that faces in the direction of axially movable disk 16 and that ends in a ring 38, on whose side facing away from axially movable disk 16 two circumferentially spaced ramp surfaces 40 are formed. Between the first ramp surfaces 26 and the second ramp surfaces 40 rolling elements 42 are situated, which extend through cutouts formed in the sensing piston 36. The axial position of rolling elements is determined primarily by ramp surfaces 26, 40 and the radial position is determined primarily by guide surfaces 43 formed on guide ring component 20, coordinated with the ramp surfaces, as well as a radially outer surface of an axial extension of axially movable disk 16.

Between sensing piston 36 and axially movable disk 16 a torque sensing chamber 44 is formed, which is connected via radial feeder bores 46 formed in shaft 10 to a supply bore 48 extending through the shaft. Radial discharge bores 50 extend from sensing chamber 44 into a discharge bore 52 formed within the shaft.

On its side facing away from axially movable disk 16, sensing piston 36 has axially extending arms 54 that are situated at uniform intervals around the circumference. Arms 54 extend through openings formed in support ring component 22 and are formed with outer teeth 56 that mesh with inner teeth 58 of a drive gear 60, which is supported on shaft 10 and through which the transmission is driven. Sensing piston 36 is thus connected to drive gear 60, rigidly in the circumferential direction and is axially movable relative to the latter.

The construction and function of the conical pulley subassemblies described by way of example are known, and therefore will not be explained in detail. In consequence of rotation of sensing piston 36 relative to the support ring component 22, the axial position of sensing piston 36 changes as a result of corresponding shaping of ramp surfaces 26, 40, and of guide surfaces 43, and in such a way that when torque is high the sensing piston increasingly closes a discharge opening 61 from which discharge bore 52 extends, so that the hydraulic pressure in torque sensing chamber 44 increases, and axially movable disk 16 is subjected to a torque-dependent pressure in the direction toward fixed disk 12. The shift of axially movable disk 16 that is necessary to change the transmission ratio is accomplished by changing the pressure in adjusting chamber 30.

When the transmission is used in a motor vehicle, the delivery of hydraulic pressure to adjusting chamber 30 and to torque sensing chamber 44 is normally accomplished by a hydraulic pump that is driven by an internal combustion engine that serves to propel the vehicle. In order to reduce fuel consumption and improve environmental friendliness, modern motor vehicles are equipped with stop-start systems in which the internal combustion engine is automatically shut down in operating phases in which it is not needed for propelling the vehicle, for example when decelerating, when stopped at a traffic signal, or in stop-and-go traffic. The problem arises here that the supply of hydraulic pressure or hydraulic fluid to the belt-driven conical-pulley transmission is not ensured when the internal combustion engine or the pump is stopped, since when the pump is stopped the pressure in the adjusting chamber and the torque sensing chamber drops off rapidly due to leakage losses, or because hydraulic fluid drains from the adjusting chamber. The transmission is then no longer operable when the vehicle is in motion. Upon restarting the pump or the internal combustion engine, a certain period of time passes before the transmission is again supplied acceptably with hydraulic fluid; that can lead to dangerous situations, and during that time the transmission can be damaged by insufficient contact pressure against the endless torque-transmitting means.

An object of the present invention is to provide a remedy for the above-identified problems.

SUMMARY OF THE INVENTION

Briefly stated, in accordance with one aspect of the present invention, a hydraulic supply system is provided for a hydraulically actuated automatic transmission, in particular for a belt-driven conical-pulley transmission. The supply system includes a supply pump to supply pressure in a supply line connected to a regulating valve, which supply line is connected through a pilot valve to a control line. A control valve is situated in the control line, with which a pressure that determines the setting of the regulating valve can be set in the control line. An auxiliary pump is drivable by an auxiliary drive that is separate from a drive of the supply pump, and the outlet line of the auxiliary pump is connected to the control line through a first valve that opens in the direction of the control line and is connected to the supply line through a second valve that opens in the direction of the supply line.

The hydraulic system in accordance with the invention is suitable for use to a large extent in all types of hydraulically actuated automatic transmissions, and can be used quite generally for hydraulically actuated devices.

Advantageously, the pilot valve is designed so that the pressure in the control line does not rise above a predetermined value.

In order to limit the pressure in the control line, the pilot valve has a return line that opens above a predetermined pressure, for example.

The supply line can be connected to a control chamber of a pressure control valve, through which the supply line is connected to a torque sensing chamber of the automatic transmission. The connection of the auxiliary pump to the control line can be designed in such a way that when the auxiliary pump is being driven an operating pressure is present in the supply line that ensures a minimum opening of the pressure control valve.

In one embodiment of the hydraulic system in accordance with the present invention, an orifice plate is situated between a first check valve and the opening of the outlet line from the auxiliary pump with the control line, and a connecting line in which a second check valve is situated, which connecting line leads into the supply line and branches off between the orifice plate and the first check valve.

In another embodiment of the hydraulic supply system in accordance with the present invention, the outlet line from the auxiliary pump is connected through a differential pressure valve to the control line and through a connecting line that branches off from the outlet line upstream from the differential pressure valve and in which the check valve is situated and which opens into the supply line.

The pump provided for the normal supply of the hydraulic supply system is advantageously driven by an internal combustion engine for driving a motor vehicle. The auxiliary pump is advantageously driven by an electric motor that is placed in operation when the internal combustion engine is stopped.

The invention, which can also be employed in vehicles with a hybrid drive system, will be described below in exemplary form on the basis of schematic drawings and with additional details.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
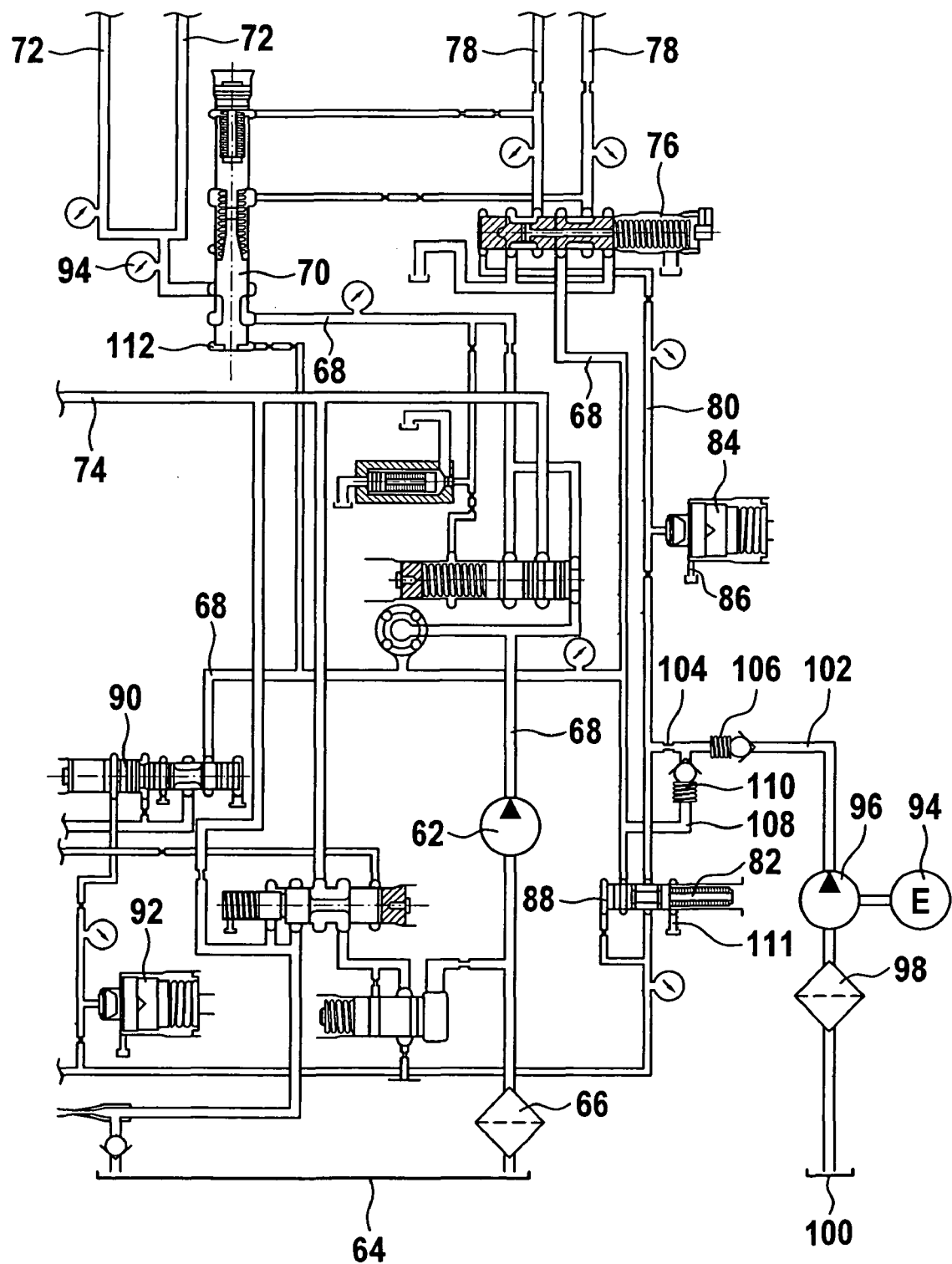
FIG. 1 is a block diagram of parts of a hydraulic supply system in accordance with an embodiment of the present invention for a belt-driven conical-pulley transmission.
Figure 3:
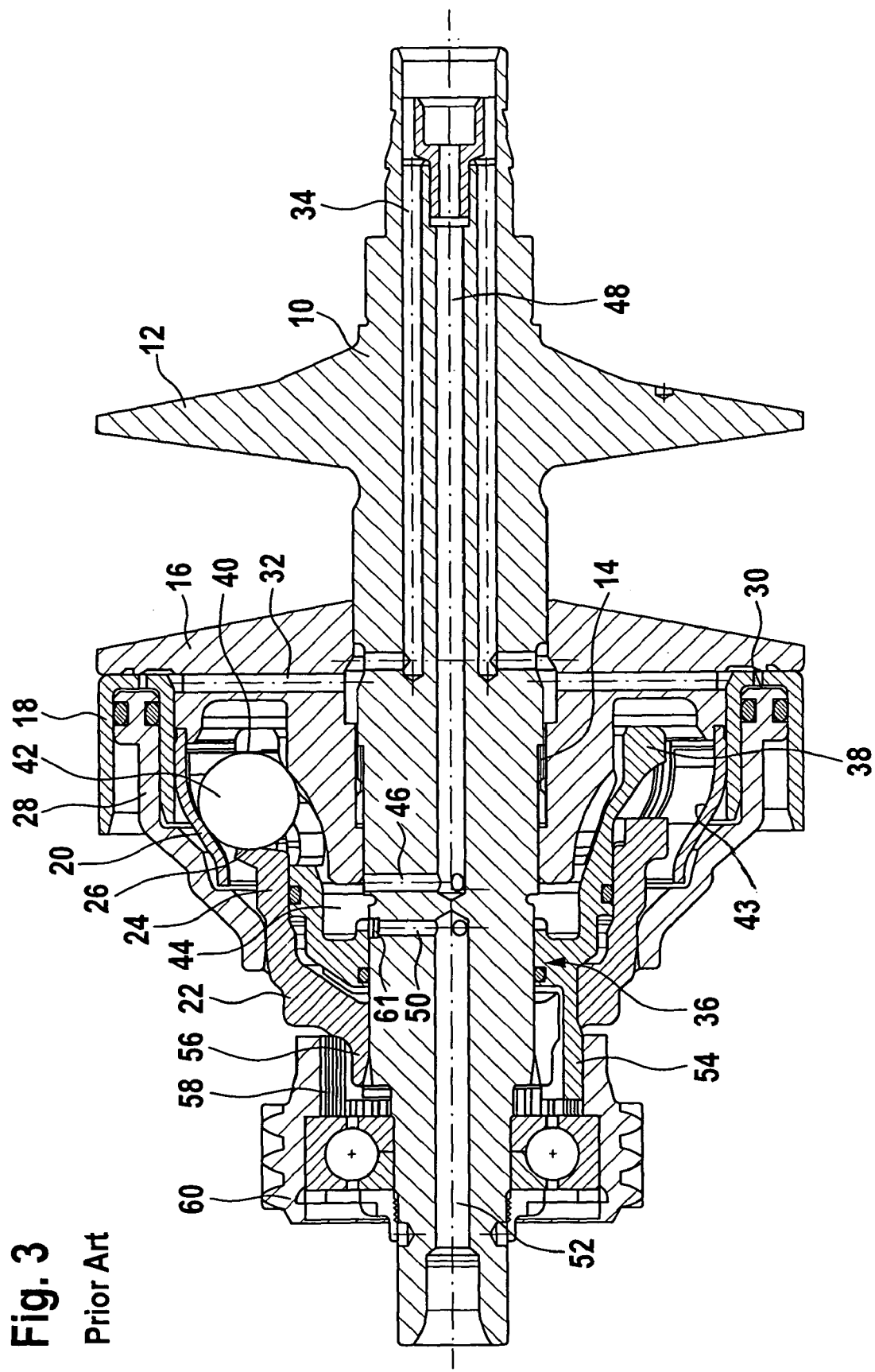
FIG. 3 is a longitudinal cross-sectional view through a known conical pulley subassembly.

In accordance with FIG. 1, a hydraulic system for supplying a belt-driven conical-pulley transmission includes a pump 62 that is driven by an internal combustion engine (not shown), and that draws hydraulic fluid from a storage tank 64 through a filter 66 and builds up system pressure in a supply line 68. Supply line 68 leads through a pressure control valve 70 to lines 72, to each of which one of the supply bores 48 (see FIG. 3) of each conical pulley subassembly is connected, and through which torque-dependent contact pressure on the endless torque-transmitting means is accomplished.

A return line connected to discharge bore 52 within shaft 10 (see FIG. 3) is indicated in FIG. 1 by reference numeral 74. Supply line 68 communicates through a transmission ratio adjusting valve 76 with lines 78, each of which is connected to an axial channel 34 (see FIG. 3) of a respective conical disk subassembly, and through which adjusting chamber 30 is pressurized.

Transmission ratio adjusting valve 76 is actuated by means of a control line 80 that is connected to supply line 68 through a pilot valve 82. An electrically actuated control valve 84 in the form of a proportional valve is positioned in control line 80 and connects control line 80 to a return line 86 when it is completely open. The position of pilot valve 82 is essentially determined by feedback to its pilot chamber 88 of the pressure that is present in control line 80.

Supply line 68 leads further to a clutch valve 90, through which clutches contained in the belt-driven conical-pulley transmission for forward and reverse travel and a selector lever valve are supplied with hydraulic pressure. An electrically actuated clutch control valve is identified by reference numeral 92.

The construction and function of the hydraulic supply system that has been described thus far are known, and therefore they will not be described in further detail. Electrically operated control valves 84 and 92, as well as other control valves, are actuated by an electronic control unit (not shown) in accordance with predetermined programs. The values of operating parameters of the power train that are essential for operation of the belt-driven conical-pulley transmission, for example the position of an accelerator pedal, vehicle speed, rotational speed of the internal combustion engine, etc., are provided at inputs to the electronic control unit. Pressures prevailing at various locations in the hydraulic system are detected with the aid of pressure sensors 94 and are utilized for monitoring the operation and for control purposes.

To ensure that the belt-driven conical-pulley transmission will be supplied with hydraulic fluid even when pump 62 is not running, an auxiliary pump 96 driven by an electric motor 94 is provided. Auxiliary pump 96 draws hydraulic fluid through a filter 98 from a storage tank 100 and conveys it into an outlet line 102. Of course, storage tank 100 can be the same as storage tank 64 and filter 98 the same as filter –96.

Outlet line 102 connects with and flows into control line 80. An orifice plate 104 (a constricted cross section) is situated upstream from the convergence of outlet line 102 and control line 80. A first check valve 106 is situated upstream from orifice plate 104 and opens in the direction toward the orifice plate. Between orifice plate 104 and first check valve 106 a connecting line 108 branches off and flows into supply line 68 and in which a second check valve 110 is situated that opens in the direction toward supply line 68.

Pilot valve 82 includes a return line 111, from which hydraulic fluid emerges when the pressure in control line 80 exceeds a predetermined value.

Also in accordance with the present invention, a control chamber 112, the pressure within which essentially determines the position of pressure control valve 70, is connected to supply line 68.

The function of the described arrangement is as follows:

Let it be assumed that pump 62 is not running. By way of the electronic control unit (not shown), electric motor 94 is then set in operation to drive auxiliary pump 96, which supplies control line 80 and supply line 68 with hydraulic fluid through check valves 106 and 110. Pilot valve 82 is open as long as the pressure in pilot chamber 88 remains below a pressure determined by a spring within pilot valve 82. As soon as a pressure of, for example 5 bar, is reached in control line 80, pilot valve 82 closes. To keep the pilot pressure from rising higher, the return line 111 of pilot valve 82 is provided, through which hydraulic fluid flows back into the storage tank when the pressure in control line 80 rises above 5 bar.

As long as pilot valve 82 is open, supply line 68 would only be able to be supplied with hydraulic fluid by auxiliary pump 96 from control line 80 through the open pilot valve 82. In order that supply line 68 is supplied with hydraulic fluid even when pilot valve 82 is closed, connecting line 108 is provided, through which supply line 68 is supplied directly with hydraulic fluid.

Pressure control valve 70 is adjusted so that it closes at a pressure of less than 6.5 bar, for example, in its control chamber 112. Because of the return line 111 on pilot valve 82, the pressure in control line 80, and hence inherently also in supply line 68, is limited to 5 bar. Pressure control valve 70 would be closed under those circumstances, so that torque sensing chamber 44 (see FIG. 3) would not be supplied with hydraulic fluid. In order to nevertheless supply torque sensing chamber 44 with a certain minimum liquid flow, i.e., to open pressure control valve 70 by a certain measure, orifice plate 104 is provided ahead of the junction of outlet line 102 and control line 80. That allows a higher pressure to exist in connecting line 108 than in control line 80, which higher pressure is sufficient for a minimum opening of pressure control valve 70. However, the value of that higher pressure, or the difference between the pressure in control line 80 and in supply line 68, depends on the flow volume through orifice plate 104, and is larger the greater that flow volume is.

Figure 2:
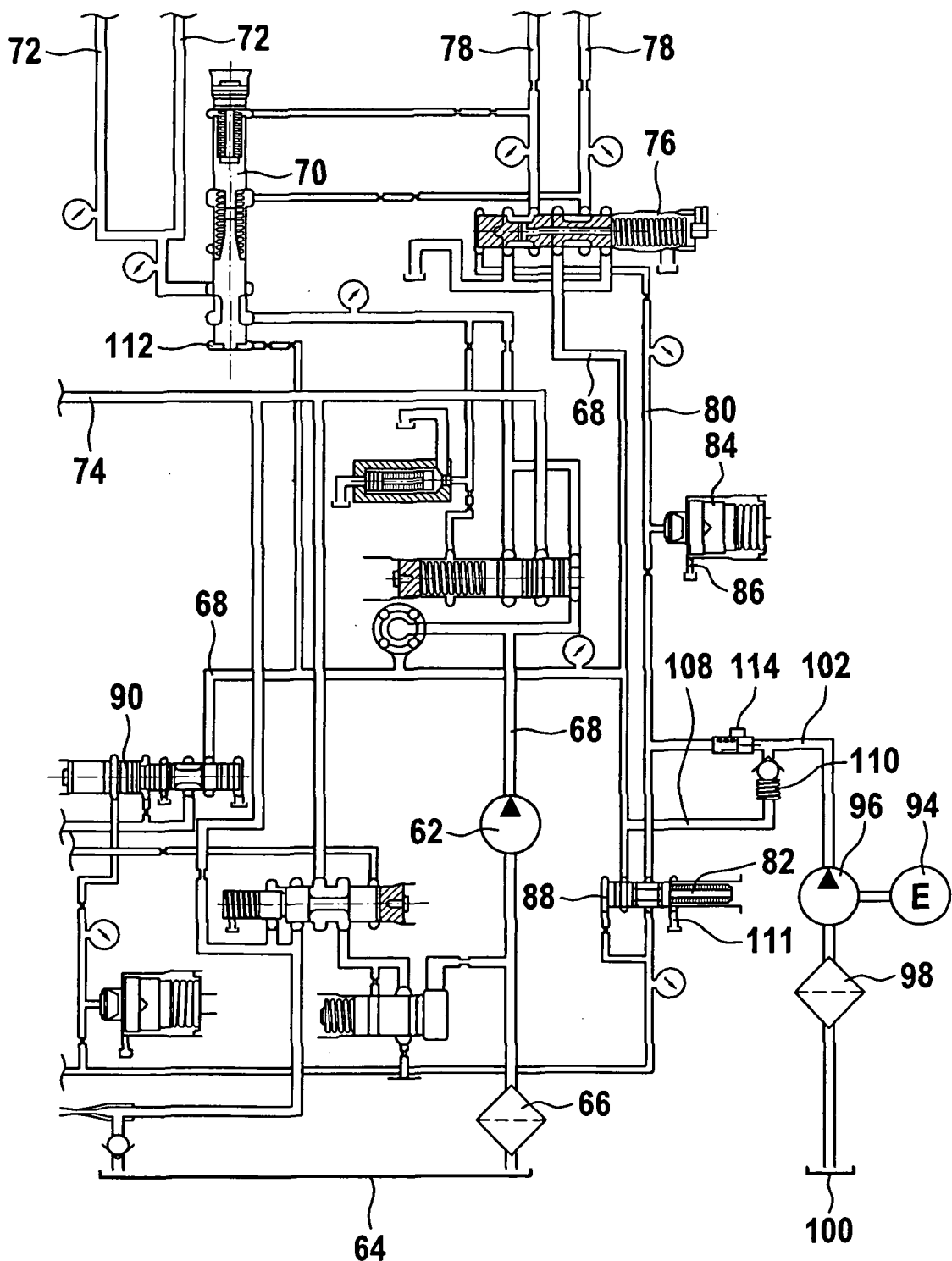
FIG. 2 is a block diagram of an embodiment of a hydraulic system modified from the system shown in FIG. 1.

FIG. 2 shows an embodiment of the hydraulic supply system that is modified from the system shown in FIG. 1. In the embodiment in accordance with FIG. 2, the orifice plate 104 of FIG. 1 is omitted and the check valve 106 of FIG. 1 is replaced by a pressure differential valve 114. Additionally, connecting line 108 branches off from outlet line 102 upstream of pressure differential valve 114. As in the embodiment in accordance with FIG. 1, a check valve 110 that opens to supply line 68 is provided in connecting line 108.

The function of the arrangement in accordance with FIG. 2 is as follows:

Assume that pump 62 is not running and that auxiliary pump 96 starts up, driven by electric motor 94. Initially, supply line 68 and control line 80 are without pressure. Pressure differential valve 114 is closed, and the auxiliary pump provides hydraulic fluid into supply line 68 through check valve 110 as it opens. Pilot valve 82 is also open initially, so that hydraulic pressure builds up both in supply line 68 and in control line 80. When the pressure in control line 80 has increased to 5 bar, for example, pilot valve 82 closes, with the pressure in control line 80 being held at about 5 bar because of the return of the pressure in control line 80 into pilot chamber 88. The pressure in supply line 68 continues to increase until a pressure of 6.5 bar, for example, is reached in control chamber 112, which results in a partial opening of pressure control valve 70, so that hydraulic fluid flows through the lines 72. If the pressure in supply line 68 rises over 6.5 bar, for example due to an error in the flow path leading through the torque sensing chamber 44 (see FIG. 3), pressure differential valve 114 opens at a pressure differential between the higher pressure in outlet line 102 and the pressure in control line 80 of more than 3 bar, for example, so that a pressure relief occurs via the return line 111 of the closed pilot valve 82.

In contrast to the embodiment in accordance with FIG. 1, in which the pressure differential between the pressure in supply line 68 and the pressure in control line 80 depends on the velocity of flow of the hydraulic fluid through orifice plate 104, in the embodiment in accordance with FIG. 2 that pressure differential is not dependent upon the velocity of flow, but can be set at a constant value by means of pressure differential valve 114.

With both exemplary embodiments of the present invention, in critical driving situations in which pump 62 does not ensure an adequate supply of pressure, for example at low rotational speeds of the internal combustion engine and high fluid throughput through the lines 72, electric motor 94 can also be placed in operation in addition, so that auxiliary pump 96 supports the system. In that way pump 62 can be designed for lower transport capacities at lower engine speeds, i.e., it can be smaller overall.

The illustrated example of a hydraulic system can be modified in many ways. For example, if pressure control valve 70 is so designed, its control chamber 112 can be connected to control line 80. And although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for a hydraulically actuated automatic transmission, said hydraulic system comprising: a primary pump driven by a primary drive system for supplying pressure in a supply line connected to a transmission ratio adjusting valve, wherein the supply line is connected through a pilot valve to a control line in which a control valve is situated, and wherein a pressure in the control line is adjustable and determines a setting of the transmission ratio adjusting valve; and an auxiliary pump that is driven by an auxiliary drive system that is separate from the primary drive system of the primary pump, wherein the auxiliary pump includes an outlet line connected to the control line through a first valve that opens in the direction of the control line, and includes a connecting line extending from the auxiliary pump outlet line and connected to the supply line through a second valve that opens in the direction of the supply line.

2. A hydraulic system in accordance with claim 1, wherein the pilot valve controls the pressure in the control line to not exceed a predetermined pressure value.

3. A hydraulic system in accordance with claim 2, wherein the pilot valve includes a return line that opens above a predetermined pressure.

4. A hydraulic system in accordance with claim 1, wherein the supply line is connected to a control chamber of a pressure control valve through which the supply line is connected to a torque sensing chamber of the automatic transmission, and wherein when the auxiliary pump is being driven, the auxiliary pump is connected to the control line and to the supply line so that an operating pressure is present in the supply line to ensure a minimum opening of the pressure control valve.

5. A hydraulic system in accordance with claim 4, wherein the first and second valves are each check valves and a flow restriction is provided between the first check valve and a junction of the outlet line from the auxiliary pump with the control line, wherein the hydraulic system includes a connecting line that branches off between the flow restriction and the first check valve and connects with the supply line, and wherein the second check valve is positioned in the connecting line.

6. A hydraulic system in accordance with claim 4, wherein the first valve is a pressure differential valve and the second valve is a check valve, wherein an outlet line from the auxiliary pump is connected to the control line through the pressure differential valve, wherein the hydraulic system includes a connecting line that branches off upstream from the pressure differential valve and connects with the supply line, wherein the second check valve is positioned in the connecting line.

7. A hydraulic system in accordance with claim 1, wherein the primary pump is driven by an internal combustion engine for propelling a motor vehicle and the auxiliary pump is driven by an electric motor that operates the auxiliary pump at least when the internal combustion engine is not running.

* * * * *